No. 854,450.  
PATENTED MAY 21, 1907.
J. C. BARTLETT.  
LIQUID HEATING SYSTEM.  
APPLICATION FILED APR. 9, 1906.
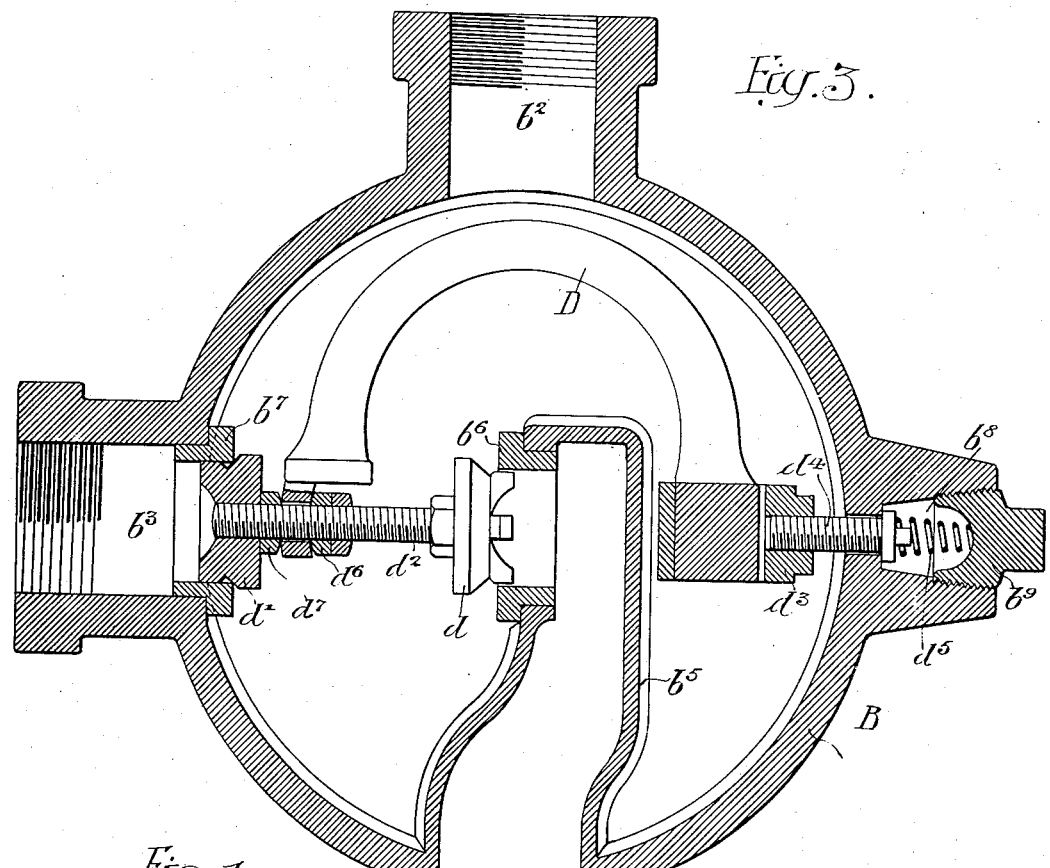
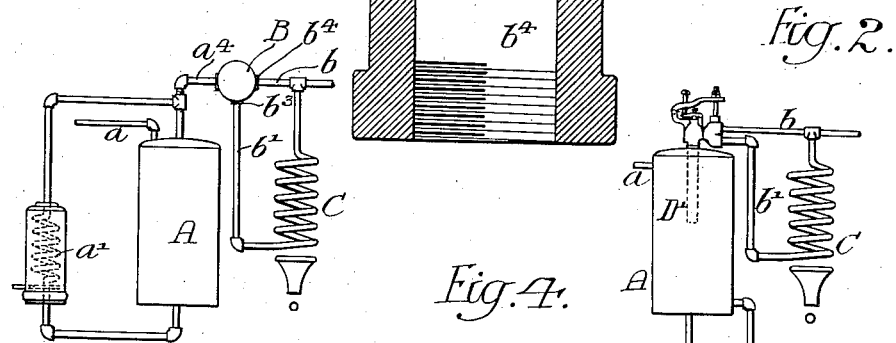
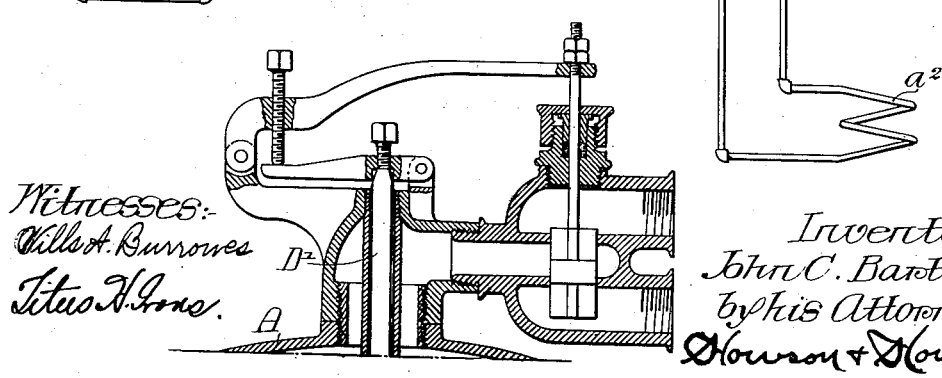
Witnesses:  
Will A. Burrowes  
Titus N. Ivins
Inventor  
John C. Bartlett  
by his Attorneys  
Howson & Howson

UNITED STATES PATENT OFFICE.

JOHN C. BARTLETT, OF PHILADELPHIA, PENNSYLVANIA.

LIQUID-HEATING SYSTEM.

No. 854,450.   Specification of Letters Patent.   Patented May 21, 1907.

Application filed April 9, 1906. Serial No. 310,719.

*To all whom it may concern:*

Be it known that I, JOHN C. BARTLETT, a citizen of the United States, residing in Philadelphia, Pennsylvania, have invented certain Improvements in Liquid-Heating Systems, of which the following is a specification.

One object of my invention is to provide a liquid heating system which shall include two heating devices, and be capable of so controlling the flow of liquid that if said liquid be not heated to a predetermined temperature in the first of the heating devices, it will be automatically directed to the second heating device where its temperature will be raised to the desired point. In the event of the liquid from the first heating device being already at the desired temperature, I so arrange the apparatus that said liquid is delivered directly to the hot main without being required to pass through the second heating device.

Another object of the invention is to provide a novel form of automatic flow controlling device for use in connection with such a system as that above outlined.

These objects I attain as hereinafter set forth, reference being had to the accompanying drawings, in which:

Figure 1, is a diagrammatic view of a liquid heating system designed according to my invention; Fig. 2, is a diagrammatic view illustrating a modification of the liquid heating system shown in Fig. 1; Fig. 3, is a sectional plan, illustrating in detail one form of the improved flow controlling device employed in connection with the system illustrated in Fig. 1, and Fig. 4, is a vertical section of that form of the flow controlling device illustrated in Fig. 2.

Referring to Fig. 1, of the above drawings, A is a hot water boiler such, for example, as the common range boiler, having a cold water inlet pipe $a$ and provided with any desired means for heating the water within it; in the case illustrated a gas heater $a'$ connected to the top and bottom of said boiler. It is, of course, obvious that there are numerous other ways for heating the water within the boiler A; such, for example, as shown in Fig. 2, by means of a coil of pipe $a^2$, designed to be placed within a furnace. In any case, the arrangement is such that the boiler A constitutes a source of supply of hot liquid and has connected to its upper portion an outlet pipe $a^4$, which enters a casing B containing certain flow controlling apparatus hereinafter described. This casing is provided with two other openings, to one of which is connected an outlet pipe or hot main $b$ leading to any point to which hot water is to be supplied, while to the other is connected a pipe $b'$ leading to an auxiliary water heater C. This latter heater is preferably of the well known gas operated type provided with means for automatically turning on and lighting a burner whenever the liquid passing through its coils is below a predetermined temperature, or automatically extinguishing the burner when the fluid passing through it is already of the desired temperature a desirable form of heater being illustrated in the U. S. Patent to E. Ruud, 443,797, Dec. 30, 1890. The upper end of the coil of this auxiliary heater is connected to the hot water main $b$, so that it delivers directly to the place at which such water is used.

The casing B has in addition to the three openings $b^2$, $b^3$ and $b^4$ for the pipes $a^4$, $b'$ and $b$ a conduit $b^5$ in connection with the opening $b^4$, which conduit is provided with a valve seat $b^6$. The opening $b^3$ is similarly provided with a valve seat $b^7$ and, in the present instance, the center lines of these two seats are coincident. Coacting with said seats $b^6$ and $b^7$ are two valves $d$ and $d'$ carried upon a common rod $d^2$ of such length that when one valve is seated the other is necessarily some distance from its seat. Also within the casing is placed a thermostat D, in the present instance semi-circular in form, one end of which is fixed to a piece $d^3$ carried upon a screw $d^4$ projecting through the wall of the casing B into a recess $b^8$ closed by a plug $b^9$. Said screw is headed and though passing loosely through the casing wall is normally held in its innermost position by means of a spring $d^5$ confined between its head and the plug $b^9$. The opposite end of the thermostat D is adjustably connected to the valve rod $d^2$ by means of a pair of nuts $d^6$ and $d^7$ threaded upon said rod, thus allowing the point of its attachment to the thermostat to be varied as may be found necessary.

Under operating conditions, the thermostat and the valves attached thereto are so adjusted that so long as the water or other liquid from the reservoir A entering at $b^2$ is at the predetermined temperature, the valve $d'$ will be held upon its seat $b^7$, thereby leaving unseated the valve $d$ and permitting liquid to flow from said opening $b^2$ through the casing into its conduit $b^5$ to the main $b$ and to the point of consumption.

If, for any reason, the liquid coming from the boiler A should be at a temperature below that predetermined, the thermostat D will so act as to seat the valve $d$ and unseat the valve $d'$, so that liquid entering the casing B through the opening $b^2$ will be compelled to pass out of the opening $b^3$ to the pipe $b'$ and the auxiliary heater C, which, as before noted, is designed to operate automatically to raise the temperature of the liquid passing through it to some predetermined point preferably the same as that at which the thermostat D seats the valve $d'$.

If desired, the thermostat instead of being of the form illustrated in Fig. 3, may be of the well known elongated type and placed directly within the boiler A, as clearly illustrated at $D'$ in Fig. 4. In any case, however, its operation is the same as that above noted.

In the event of the fluid delivered to the casing B through the opening $b^2$ being at an excessively high temperature, there would be a tendency to undue distortion of the thermostat and in order to obviate the possibility of damage from this cause I provide the construction illustrated in Fig. 3, whereby in the event of such conditions as those above noted, the spring $d^5$ would be compressed and the supporting screw $d^4$ forced to a greater or less extent into the recess $b^8$. When the abnormal conditions no longer exist said spring $d^5$ forces the screw $d^4$ into the casing until its head contacts with the bottom of the recess $b^8$, after which the further bending together of the ends of the thermostat unseats the valve $d'$.

I claim as my invention:

1. A liquid heating system consisting of a main heater, an auxiliary heater, connections for the inlet and outlet of liquid to and from the system, a device connected to said heaters having means for automatically directing liquid received from the main heater, either to the auxiliary heater or to the outlet, depending on whether the temperature of said liquid is below a predetermined point or not, substantially as described.

2. A liquid heating system consisting of a main heater connected to a source of liquid supply, an auxiliary heater connected to a discharge main, a conduit connecting said heaters, and a device connected in said conduit and to the discharge main, said device including automatic temperature actuated means for directing liquid entering it from the main heater either to the auxiliary heater or to the discharge main, substantially as described.

3. A liquid heating system consisting of a main and an auxiliary heater, a conduit connecting said heaters, liquid inlet and discharge pipes connected to the system, a casing connected between the heaters and also in connection with the discharge conduit, a thermostat in said casing, and valves actuated by said thermostat for directing liquid received from the main heater either to the auxiliary heater or to the discharge main, substantially as described.

4. A liquid heating system consisting of a main and an auxiliary heater, a casing connected between said heaters, a discharge main connected to the auxiliary heater and to the casing, a liquid inlet for the system, valves in the casing respectively controlling passages to the auxiliary heater and to the discharge main, and a thermostat for actuating said valves, substantially as described.

5. A liquid heating system consisting of a main and an auxiliary heater, a casing connected between said heaters, a discharge main connected to the auxiliary heater and to the casing, a liquid inlet for the system, valves in the casing respectively controlling passages to the auxiliary heater and to the discharge main, and a thermostat for actuating said valves, with means for adjustably connecting the thermostat to said valves, substantially as described.

6. A liquid heating system including a reservoir for liquid, an inlet thereto, means for supplying heated liquid to said reservoir, an auxiliary heater, a discharge main connected thereto, a casing connected to both of said heaters and also to the discharge main, two valves in the casing respectively controlling the openings therefrom to the auxiliary heater and to the discharge main, and a thermostat in the casing constructed to open the valve to the auxiliary heater and close that to the discharge when the temperature of the liquid entering it from the reservoir is below a predetermined point, and to close the valve to the auxiliary heater and open that to the discharge main when the temperature of said liquid is above a predetermined point, substantially as described.

7. A liquid heating system consisting of a main and an auxiliary heater, a conduit connecting said heaters, liquid inlet and discharge pipes connected to the system, a casing having openings connected between the heaters and in connection with the discharge conduit, valves respectively for certain of the casing openings, a rod connecting said valves, and a curved thermostat connected to the rod and to the casing, substantially as described.

8. A liquid heating system consisting of a main and an auxiliary heater, a conduit connecting said heaters, liquid inlet and discharge pipes connected to the system, a casing connected between the heaters and in connection with the discharge conduit, valves placed to control the flow of liquid from the casing, a thermostat connected to said valves, the casing having a plug-closed recess, a rod connected to the thermostat extending into said recess and a spring in the recess operative on said rod, substantially as described.

In testimony whereof, I have signed my name to this specification, in the presence of two subscribing witnesses.

JOHN C. BARTLETT.

Witnesses:
 WM. E. SHUPE,
 JOS. H. KLEIN.